United States Patent [19]

Avila

[11] Patent Number: 5,398,959
[45] Date of Patent: Mar. 21, 1995

[54] PANEL COVER DOOR ATTACHMENT FOR INFLATABLE OCCUPANT RESTRAINT

[75] Inventor: Javier Avila, Vandalia, Ohio

[73] Assignee: General Motors Corporation, Detroit, Mich.

[21] Appl. No.: 837,398

[22] Filed: Feb. 19, 1992

[51] Int. Cl.$^6$ ............................................. B60R 21/16
[52] U.S. Cl. ................................. 280/728 B; 280/732
[58] Field of Search ............... 280/728, 730, 732, 752, 280/728 R, 728 A, 728 B, 730 R

[56] References Cited

U.S. PATENT DOCUMENTS

| | | | |
|---|---|---|---|
| 3,944,250 | 3/1976 | Wulf et al. | 280/732 |
| 4,327,937 | 5/1982 | Scholz et al. | 280/732 |
| 4,893,833 | 1/1990 | DiSalvo et al. | 280/728 X |
| 4,911,471 | 3/1990 | Hirabayashi | 280/732 |
| 4,973,081 | 11/1990 | Rafferty | 280/732 |

FOREIGN PATENT DOCUMENTS 3843686  6/1990  Germany.

Primary Examiner—Robert J. Oberleitner
Assistant Examiner—Andrew C. Pike
Attorney, Agent, or Firm—Charles E. Leahy

[57] ABSTRACT

An inflatable occupant restraint device for a vehicle passenger includes an air bag and an inflator mounted subjacent an opening in the upper surface of the vehicle instrument panel for air bag deployment rearwardly through the opening. The instrument panel has a supporting substrate, a foam layer, and an outer skin. A closure arrangement for the opening comprises a cover door having a structural substrate, a foam layer, and an outer skin. A groove is formed in the panel foam layer adjacent the opening and engages a flange formed on the cover door foam layer to locate the cover door in the opening. A front tether has one end molded into the cover door between the substrate and the foam layer and the other end attached to the support adjacent the front of the opening. A pair of side tethers each have one end molded into a side edge of the cover door between the substrate and the foam layer and having the other end attached to the support adjacent the side of the opening. The tethers each have a predetermined length to enable movement of the cover door away from the opening to a predetermined position forming an open angle opening rearwardly of the vehicle panel. The inflating air bag releases the door from the panel and the door opens to the predetermined position, out of the path of the deploying air bag.

2 Claims, 3 Drawing Sheets

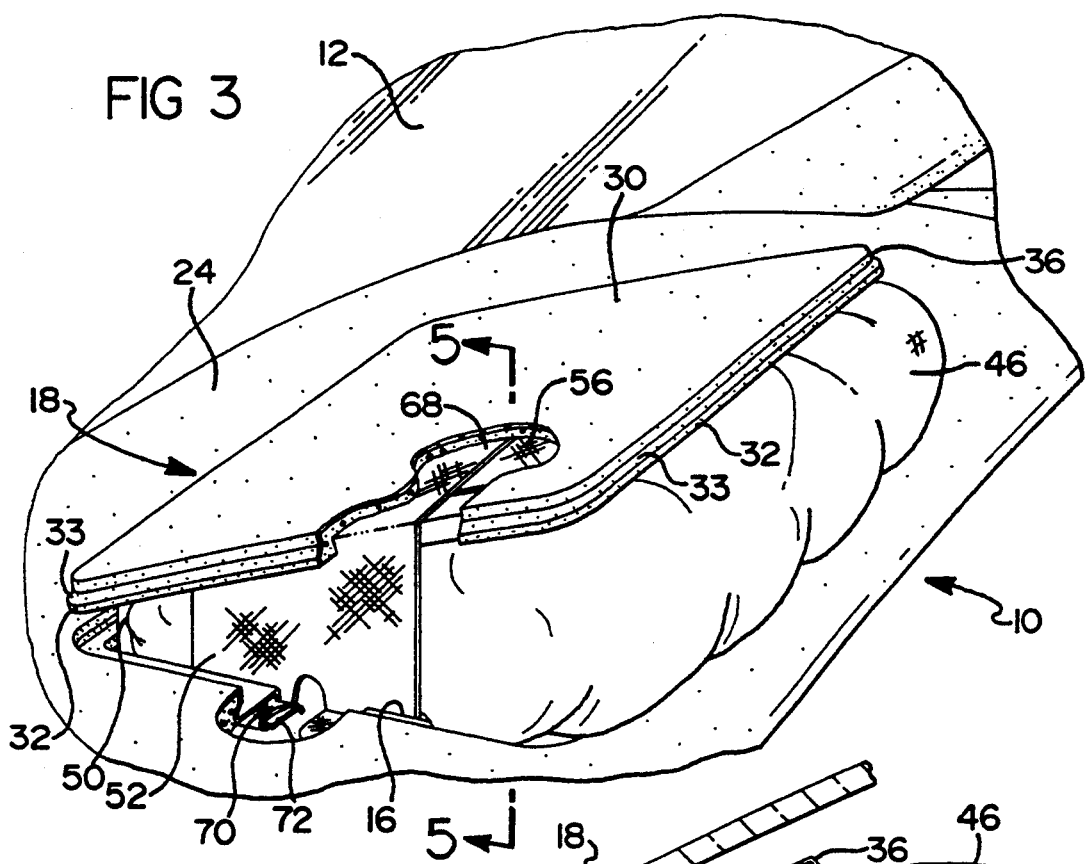
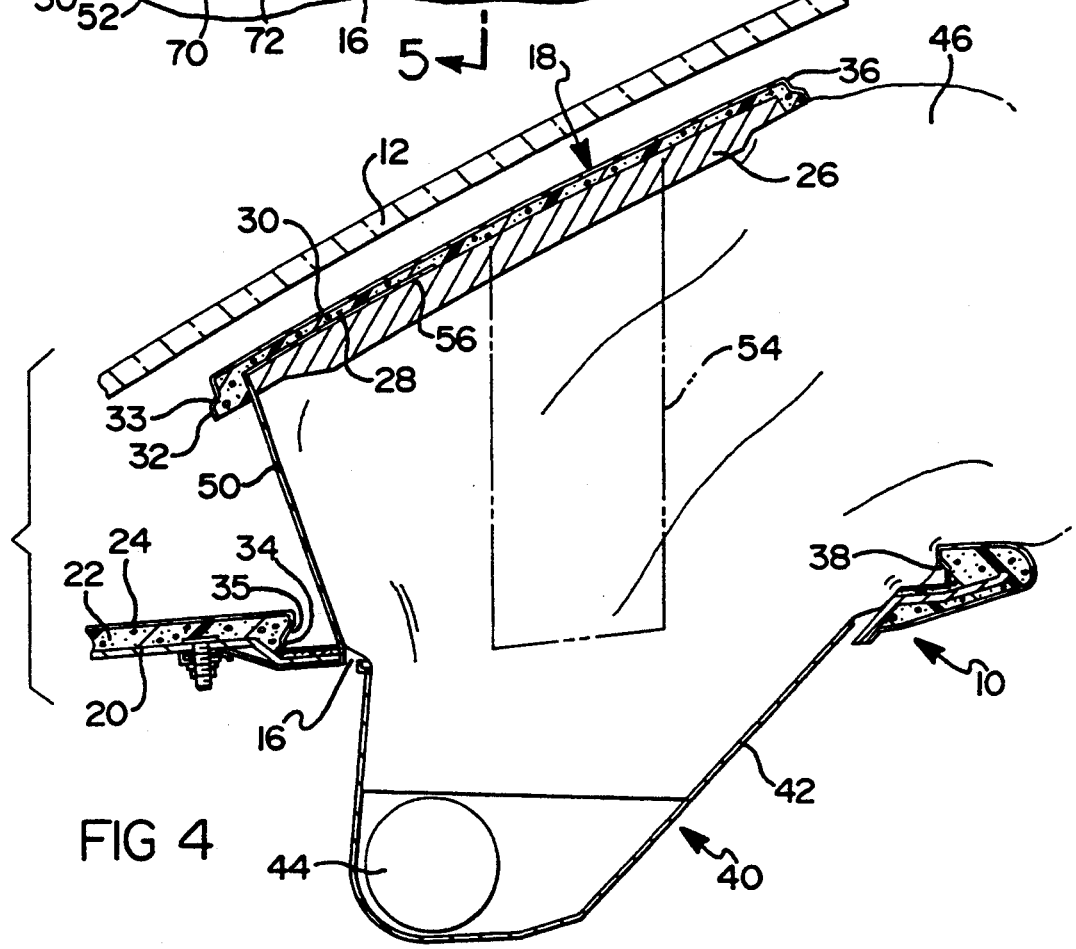

PANEL COVER DOOR ATTACHMENT FOR INFLATABLE OCCUPANT RESTRAINT

BACKGROUND OF THE INVENTION

This invention relates generally to vehicle inflatable occupant restraints and, more particularly, to the attachment of a cover door for an opening in a vehicle panel which mounts an inflatable air bag for deployment rearwardly of the panel.

Inflatable occupant restraint systems for passengers of vehicles conventionally comprise a restraint module which houses an inflatable air bag and an inflator. This module is mounted in the steering wheel hub for driver use and in a recess in the instrument panel for front seat passenger use.

The instrument panel opening is conventionally closed by a cover door that can take several forms. In one, a vertical door hinged about its lower edge to the instrument panel opens downwardly to enable deployment of the inflating bag. In another, a vertical door arrangement includes door halves which open upwardly and downwardly to enable bag deployment.

Cover doors often feature a rectangular portion of the instrument panel padded cover having weakened sections or stitching segments about three sides which are fractured by the inflating air bag to create a door which hinges about the other side to open. Such arrangements have the disadvantage of requiring replacement of the vehicle instrument panel should the bag deploy in circumstances enabling reuse of the vehicle. The location of these restraint mountings on the vertical face of the instrument panel also suffer the disadvantage of necessitating removal or repositioning of the conventional glove box.

Other restraint mounting arrangements have been developed to locate the restraint module subjacent an opening in the upper surface of the instrument panel. This location eliminates interference with the glove box. U.S. Pat. No. 3,944,250 and German Patent Application DE 3843-686-A both illustrate such a mounting which utilizes a separate, separable door that releases upon bag inflation to occupy a position against the vehicle windshield. The door forward edge is held in this position by a tether. It is known to utilize a woven fabric material which is molded into the foam and substrate laminate of the door to form this tether.

Another upper panel mounting is illustrated in U.S. Pat. No. 4,911,471 which provides a door integral with the instrument panel. Upon deployment of the inflating bag, a weakened section of the instrument panel fractures about three sides to form a door which hinges about its front edge to open. A pair of side tethers are utilized to limit opening movement of the door to prevent its rear edge from striking the vehicle windshield.

It is desirable in any installation of an inflatable restraint to provide for rapid and accurate deployment of the inflating air bag through an opening in a vehicle panel, while concealing the air bag from view. This requires a cover door mounting arrangement which enables the door to open or be removed while either assisting or not hindering deployment of the inflating bag.

It is desirable to provide a separate closure door for an opening in a vehicle panel having a subjacently mounted inflatable restraint which is separable to a predetermined position to facilitate inflating bag deployment.

SUMMARY OF THE INVENTION

It is an object of this invention to provide a separate closure door for an opening in a vehicle panel having a subjacently mounted inflatable restraint which is separable to a predetermined position to facilitate deployment of the inflating bag.

In one aspect this invention features an improved closure arrangement for an opening in a support surface in a vehicle panel which mounts an inflatable occupant restraint module, including an inflatable air bag and an inflator for the bag, subjacent the opening for bag deployment rearwardly therethrough. The closure arrangement comprises a cover door for the opening and attachment means for attaching the cover door to the vehicle panel. The attachment means comprises releasable means interengaging the cover door with the vehicle panel to mount the door in the opening; the attachment means is responsive to the force exerted by the inflating air bag to release the door from the panel. A front tether is provided and has one end secured to the front edge of the cover door and the other end attached to the support adjacent the front of the opening. A pair of side tethers each has one end secured to the side edges of the cover door and has the other end attached to the support adjacent the side of the opening. The tethers each have a predetermined length to enable displacement of the entire cover door away from the opening by inflation of the inflating bag to a predetermined position forming an open angle opening rearwardly of the vehicle panel out of the path of the deploying air bag.

Another feature of this invention is that the front tether is a woven fabric substantially as wide as the opening to prevent forward deployment of the inflating bag and the side tethers are made of a woven fabric having sufficient width to prevent sideward deployment of the inflating bag.

Yet another feature of this invention is that the releasable means comprise a groove on the panel and a flange on the door engaging the groove to interengage the door and panel. The flange and groove are deformable to release the door from the panel upon inflation of the inflatable bag to enable movement of the cover door away from the opening to a predetermined position forming an open angle opening rearwardly of the vehicle panel.

Still another feature of this invention is that the panel groove comprises a peripheral recess formed in the panel foam layer outwardly of the edge of the opening in the panel support surface, the cover door substrate overlies the edge of the support surface, and the cover door foam layer extends peripherally beyond the substrate to form the flange which engages in the groove to attach the door to the panel.

In another aspect, this invention features an inflatable occupant restraint device for deployment rearwardly through an opening in a vehicle panel adjacent the vehicle windshield. The panel has a support surface, a foam layer, and an outer skin. The device comprises an inflatable restraint module including an inflatable bag and an inflator for the bag mounted subjacent the opening, a cover door for the opening comprising a structural substrate, a foam layer and an outer skin, and attachment means for attaching the cover door to the vehicle panel. The attachment means include releasable means which comprise a groove formed in the panel foam layer adjacent the opening and a flange formed on the cover door foam layer for interengaging the cover door with the vehicle panel to secure the door in the opening. The flange and groove are deformable by the inflating bag to release the door from the panel. A front tether is provided and has one end secured to the front edge of the cover door and the other end attached to the support adjacent the front of the opening. A pair of side tethers each have one end secured to the side edges of the cover door and the other end attached to the support adjacent the side of the opening. The tethers each have a predetermined length to enable movement of the cover door away from the opening by the inflating bag to a predetermined position adjacent to, but not in engagement with, the vehicle windshield.

These and further objects and features of this invention will become more readily apparent upon reference to the following detailed description of a preferred embodiment, as illustrated in the accompanying drawings, in which:

BRIEF DESCRIPTION OF THE DRAWINGS

FIG. 2 is an enlarged sectional view, taken along line 2—2 of. FIG. 1, illustrating the cover door prior to air bag inflation;

FIG. 3 is an enlarged, partially-broken-away, detail perspective view of the vehicle instrument panel, illustrating initial opening movement of the cover door by the inflating and deploying bag;

FIG. 4 is a sectional view similar to FIG. 2, but illustrating the door fully opened by the deploying air bag, as positioned by the door tethers;

DETAILED DESCRIPTION OF A PREFERRED EMBODIMENT

Figure 1:
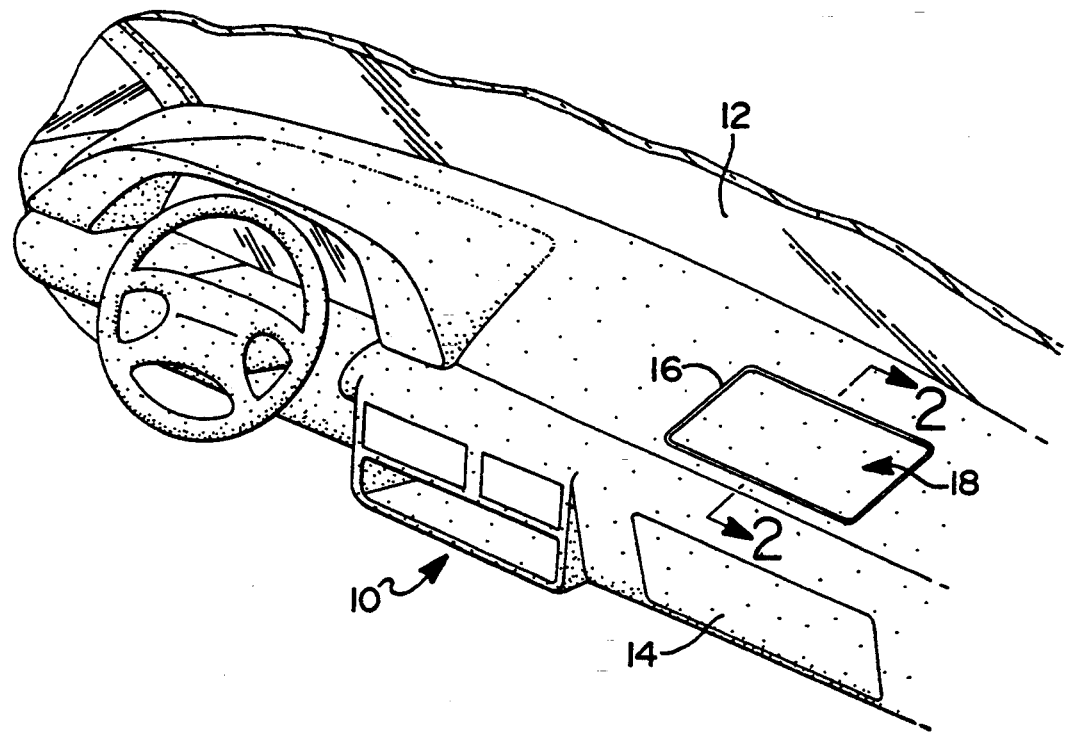
FIG. 1 is a partial perspective view of a vehicle interior, illustrating the location of a cover door for an inflatable occupant restraint module which is mounted in the top surface of an instrument panel adjacent the vehicle windshield, according to this invention.

Referring now to FIG. 1 of the drawings, a passenger vehicle includes an instrument panel 10 which is located rearwardly of the windshield 12. The instrument panel 10 includes the usual glove box closed by a glove box door 14 on its front face. On its upper surface, instrument panel 10 includes a generally rectangular opening 16 that is closed by a cover door 18. Cover door 18 is separate from instrument panel 10 and is completely removable from opening 16 in a manner described later.

Figure 2:
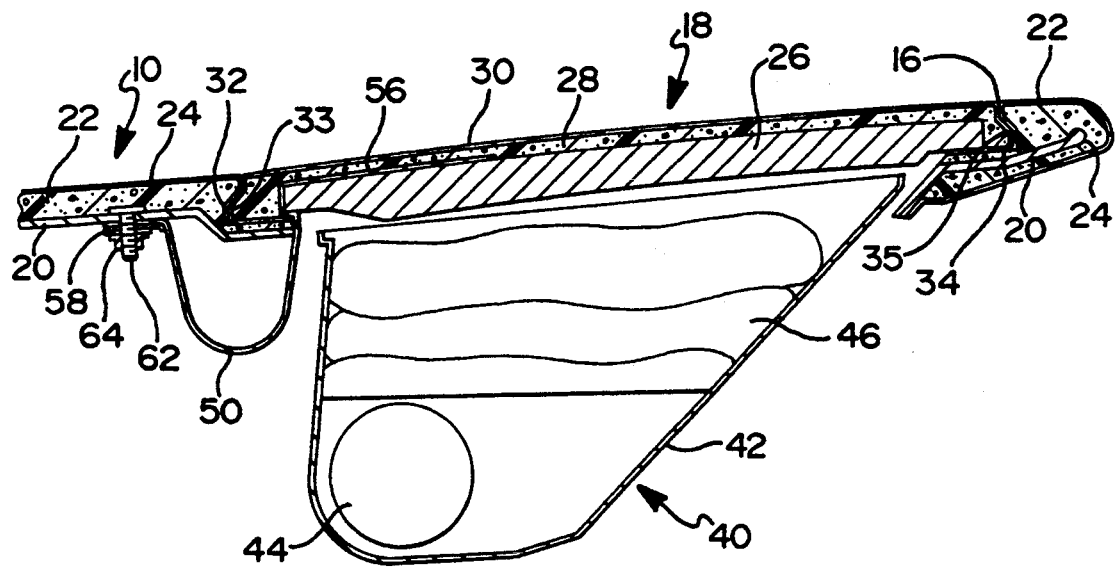

As shown in FIG. 2, Instrument panel 10 comprises a structural support 20 overlaid with a layer of foam 22 and an outer decorative skin 24. Similarly, cover door 18 has a structural substrate 26 which supports a foam layer 28 and an outer decorative skin 30, preferably identical to skin 24. Although separate, the outer surface of door 18 forms a visual continuation of the surface of the instrument panel 10 so that door is relatively unobtrusive.

Substrate material is preferably a polystyrene, while the panel supports may be structural plastic or metal Foam padding layers may be a compression molded foam material, such as sold under the trademark STYROFOAM ™. The decorative skin may be vinyl. However, a self-skinning urethane foam could also be used.

The periphery of door 18 comprises a bottom flange 32 and an inwardly-angled upper wall 33. The periphery of opening 16 provides a mating arrangement comprising a groove 34, which receives flange 32, and an outwardly-angled wall 35 that mates with door wall 33. The outer periphery 36 of door 18 abuts and is held in contact with a peripheral inward flange 38 of the instrument panel 10 by the mating groove and flange arrangement. As a result, door 18 is secured within opening 16 in a manner which prevents unintended door removal by prying.

An inflatable occupant restraint device 40 comprises a reaction and deployment container 42 which houses an inflator 44 and an inflatable air bag 46. Both the air bag 46 and the inflator 44 may be of any conventional construction and neither form any part of this invention.

As is conventional and well known, inflator is actuated in response to the vehicle experiencing a predetermined deceleration to inflate air bag 46 which deploys upwardly. The inflating air bag 46 exerts a force on door 18 which deforms the foam layers of mating peripheral door portions 32, 33 and panel portions 34, 35 sufficiently to release door 18 to enable deployment of the inflating air bag through opening 16. Movement of the door out of opening 16 is controlled in a manner which will now be described in reference to FIGS. 2-6.

Door 18 is completely separate from instrument panel 10, but is tethered to it by a front tether 50 and left and right side tethers 52 and 54. These tethers are made of a woven coated nylon and are preferably laminated structurally into door 18. The tethers 50, 52, and 54 are of a predetermined length to constrain movement of door 18 to a predetermined position upon release from opening 16, as described below.

Figure 6:
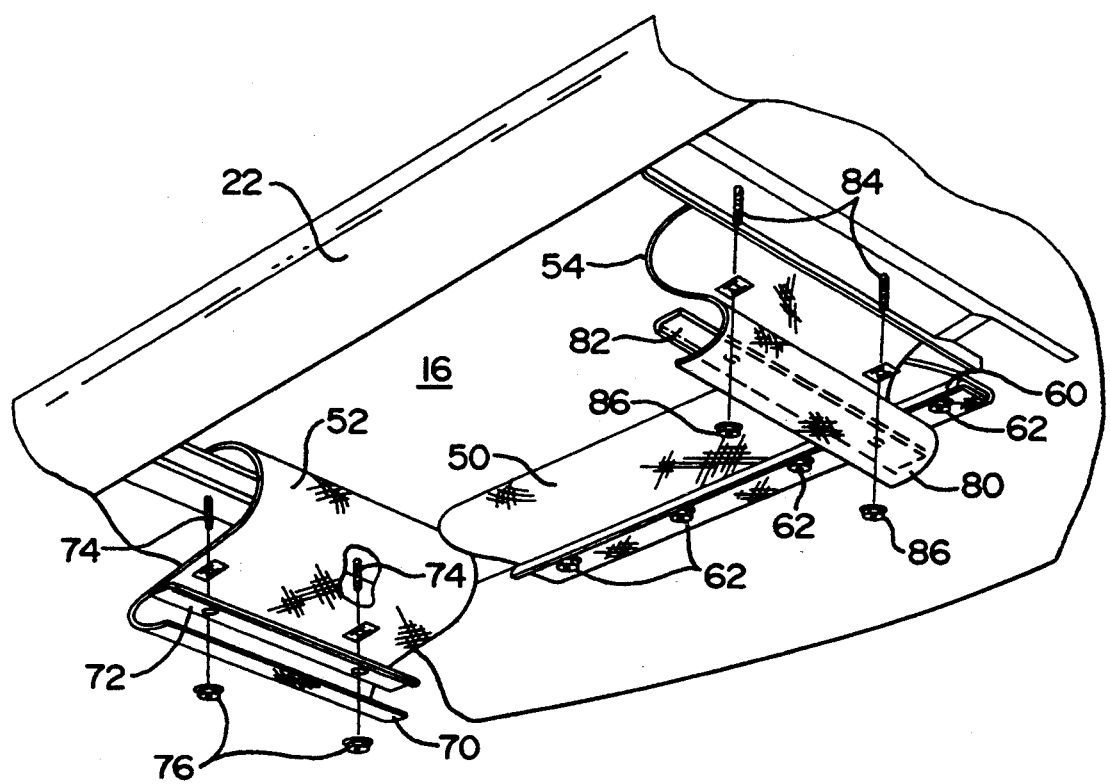
FIG. 6 is a partially exploded perspective view of the tether mounting to the instrument panel, as viewed from below the panel opening, illustrated with the cover door removed.

Front tether 50 has one end 56 laminated into door 18 between substrate 26 and foam layer 28 and extends partially forward of door 18. Tether 50 thus is an integral structural part of door 18 and can extend the entire length of the door, if desired. The other end 58 of tether 50 is looped around a mounting bar 60 which is secured to the panel support 20 by bolts 62 and nuts 64, as shown in FIGS. 2 and 6. Both the tether 50 and mounting bar 60 are apertured to receive bolts 62. In the closed position of door 18, the intermediate portion of tether 50 loops downwardly in front of container 42, as illustrated in FIG. 2.

Figure 5:
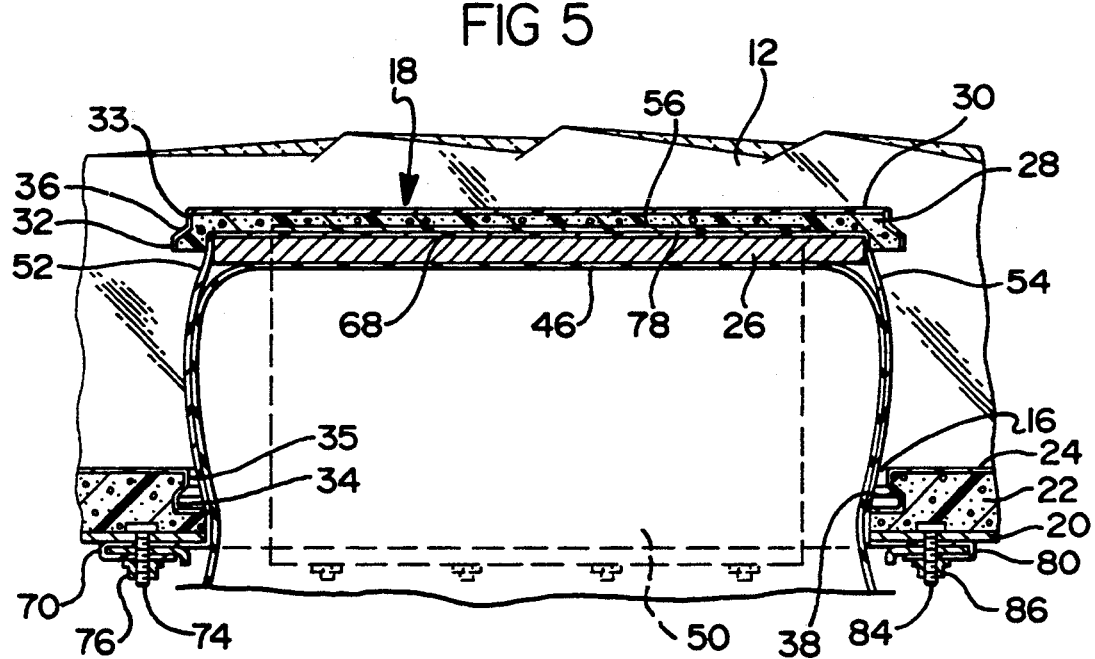
FIG. 5 is a transverse sectional view taken along line 5—5 of FIG. 3, showing the cover door fully opened by the deploying air bag as in FIG. 4.

The inward end 68 of left side tether 52 extends across door 18 and is laminated between the substrate 26 and foam layer 28, as shown in FIG. 5. The other end 70 of tether 52 is looped around a mounting bar 72 which is clamped to panel support 20 by bolts 74 and nuts 76, as illustrated in FIG. 6. The end 78 of right side tether 54 is similarly laminated into the structure door 18. The other tether end 80 is clamped to support 20 by mounting bar 82 and bolts 84 and nuts 86. In the door closed position the intermediate portions of tethers 52 and 54 are looped astride container 42.

The vehicle is built with door 18 installed in opening 16, as shown in FIGS. 1 and 2. Upon detection of a threshold deceleration, inflator 44 will be actuated in a well-known manner and air bag 46 will begin inflating. The inflating air bag will exert an increasing force on door 18 and the interengaged door and panel portions 32, 33 and 34, 35 will begin to deform until door 18 finally is broken loose. The inflating air bag 46 will begin deploying upwardly through opening 16 and will deploy rearwardly of opening 16, pushing door 18 ahead of it, as illustrated in FIG. 3. Tethers 50, 52, and 54 will trail door 18 out of opening 16 without obstructing deployment of the air bag.

This action will continue until tethers 50, 52, and 54 are fully extended, whereupon door 18 will have reached the end of its tether. This position is shown in FIGS. 4 and 5, with door 18 located closely adjacent, yet slightly spaced from, windshield 12. In this manner, door 18 moves as completely out of the path of the deploying air bag as possible without impacting any other vehicle structure.

Tethers 50, 52, and 54 and door 18 form a rearwardly open chute through which the inflating air bag can deploy unimpeded. Although air bag deployment is mainly governed by air bag geometry and folding, it is thought that this chute will aid the deployment. The lengths of all tethers will vary according to a specific vehicle design and is dependent upon the relative location of the instrument panel opening to the vehicle windshield.

It is essential that both the side and front tethers are utilized to accurately position the cover door when opened by deployment of the inflating air bag. It is also preferable to incorporate the tethers as integral structural parts of the door assembly. This will increase door strength and assure door integrity upon opening. This increased strength can now be obtained without the use of separate scrim pieces.

While only a preferred embodiment of this invention has been illustrated and described, obvious modifications thereof are contemplated within the scope of this invention and the following claims.

I claim:

1. In an inflatable occupant restraint device for deployment rearwardly through an opening in a vehicle panel having a support, a panel foam layer, and an outer skin, the device having an inflatable restraint module including an inflatable bag and an inflator for the bag mounted subjacent the opening, an improved closure arrangement for the opening comprising a cover door for the opening comprising a structural substrate overlying an edge of the support, a cover door foam layer, and an outer skin, and attachment means for attaching the cover door to the vehicle panel, comprising a groove formed in the panel foam layer adjacent the opening by a peripheral recess formed in the panel foam layer outwardly of an edge of the opening in the panel, a flange formed on the cover door by the cover door foam layer extending peripherally beyond the substrate to engage the groove to interengage the cover door with the vehicle panel to locate the door in the panel opening, the flange and the groove being deformable by the inflating bag to release the door from the panel, a front tether of woven fabric substantially as wide as the opening and having one end molded into the cover door between the substrate and the cover door foam layer and another end attached to the support adjacent a front of the opening, and a pair of side tethers of woven fabric, each having one end molded into a side edge of the cover door between the substrate and the cover door foam layer and having another end attached to the support adjacent a side of the opening, the tethers each having a predetermined length to enable movement of the cover door away from the opening by the inflating bag to a predetermined position forming an open angle opening rearwardly of the vehicle panel to direct deployment of the inflating bag, and wherein the front tether is substantially as wide as the opening and the side tethers having sufficient width to prevent sideward deployment of the inflating bag.

2. In an inflatable occupant restraint device for deployment rearwardly through an opening in a vehicle panel having a support, a panel foam layer, and an outer skin, the device having an inflatable restraint module including an inflatable bag and an inflator for the bag mounted subjacent the opening, an improved closure arrangement for the opening comprising a cover door for the opening comprising a structural substrate overlying an edge of the support, a cover door foam layer, and an outer skin, and attachment means for attaching the cover door to the vehicle panel, comprising a groove formed in the panel foam layer adjacent the opening by a peripheral recess formed in the panel foam layer outwardly of an edge of the opening in the panel, a flange formed on the cover door by the cover door foam layer extending peripherally beyond the substrate to engage the groove to interengage the cover door with the vehicle panel to locate the door in the panel opening, the flange and the groove being deformable by the inflating bag to release the door from the panel, the groove and the flange have mating interengaging wall segments that are angled inwardly upwardly to facilitate release of the door from the panel, a front tether having one end molded into the cover door between the substrate and the cover door foam layer and another end attached to the support adjacent a front of the opening, and a pair of side tethers each having one end molded into a side edge of the cover door between the substrate and the cover door foam layer and having another end attached to the support adjacent the side of the opening, the tethers each having a predetermined length to enable movement of the cover door away from the opening by the inflating bag to a predetermined position forming an open angle opening rearwardly of the vehicle panel to direct deployment of the inflating bag, and wherein the front tether is a woven fabric substantially as wide as the opening and the side tethers are made of a woven fabric having sufficient width to prevent sideward deployment of the inflating bag.

* * * * *